March 17, 1942. C. E. WILSON 2,276,443
METHOD AND APPARATUS FOR BLOCKING OFF PIPE LINES
Filed March 22, 1939 2 Sheets-Sheet 1
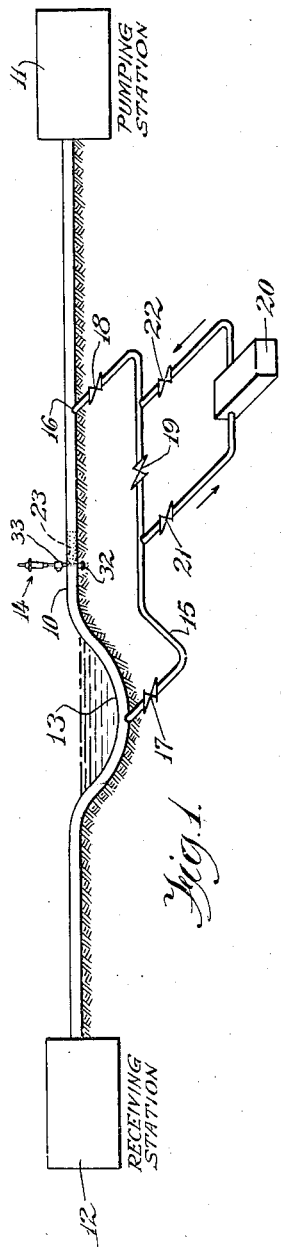
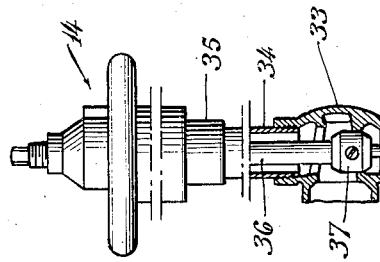
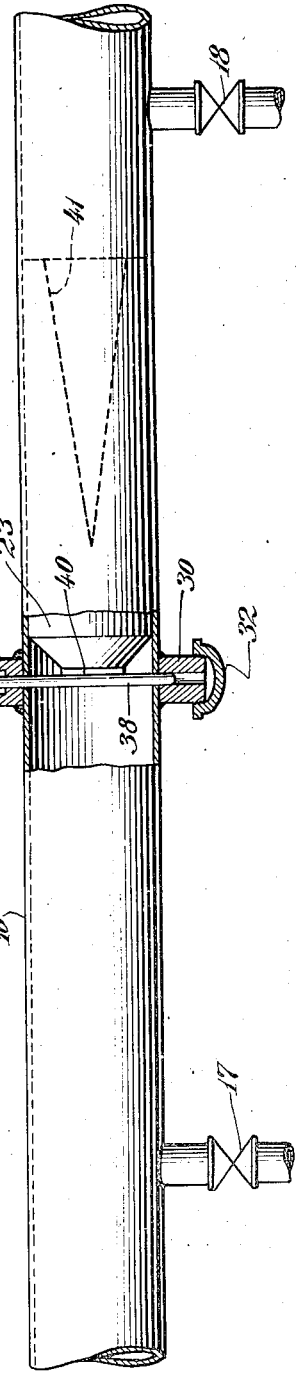
Inventor:
Charles E. Wilson
By Clarence H. Seeley
Attorney March 17, 1942.      C. E. WILSON      2,276,443
METHOD AND APPARATUS FOR BLOCKING OFF PIPE LINES
Filed March 22, 1939      2 Sheets-Sheet 2
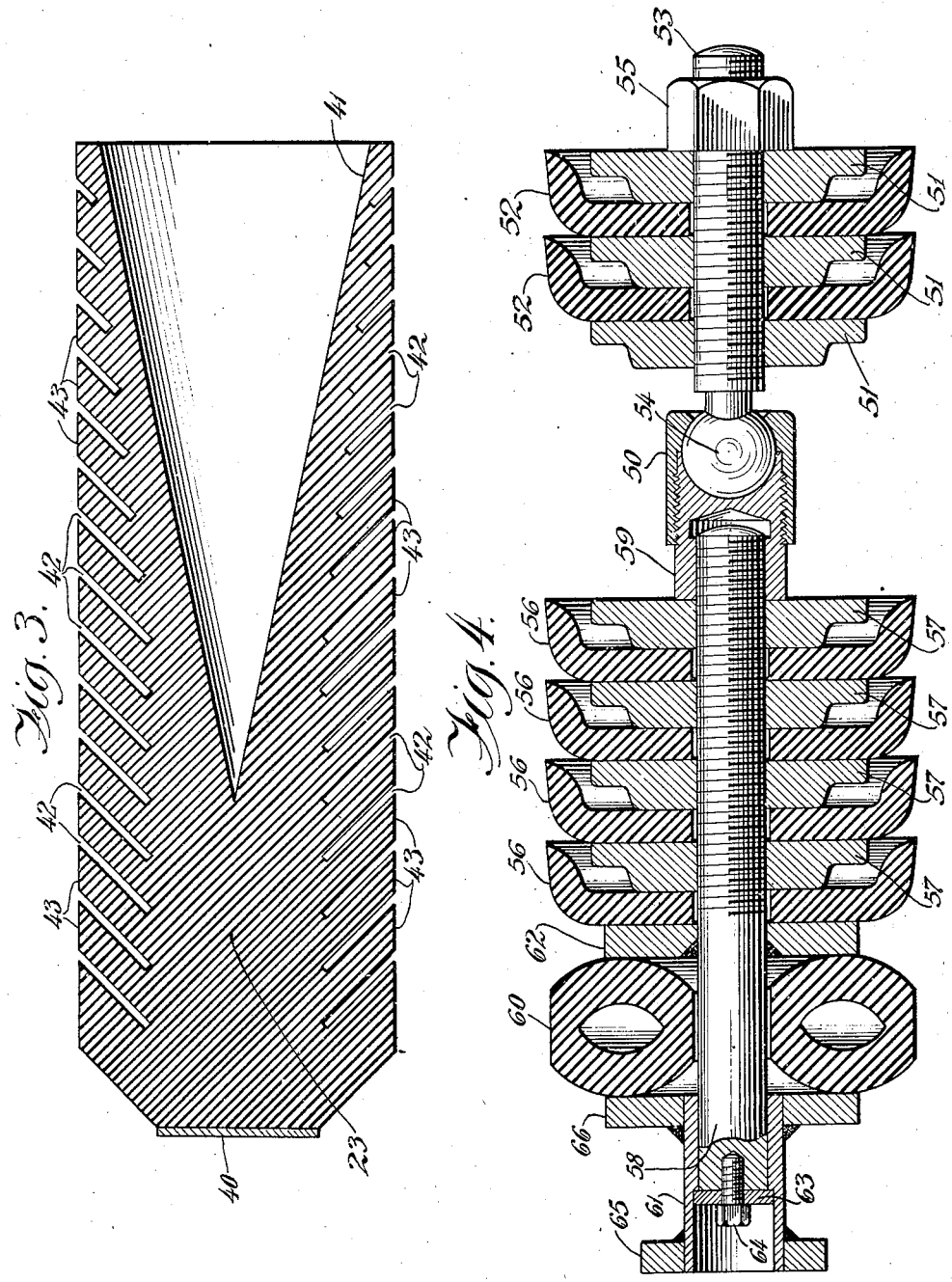
Inventor:
Charles E. Wilson
By Clarence H. Seeley
Attorney.

Patented Mar. 17, 1942

2,276,443

UNITED STATES PATENT OFFICE 2,276,443

METHOD AND APPARATUS FOR BLOCKING OFF PIPE LINES

Charles E. Wilson, Manhattan, Ill., assignor to Stanolind Pipe Line Company, Tulsa, Okla., a corporation of Maine Application March 22, 1939, Serial No. 263,332

7 Claims. (Cl. 137—78)

This invention relates to a method and apparatus for blocking off pipe lines and more particularly to the temporary plugging of a pipe line so that the fluid can be drained from the section thereof which it is desired to repair or replace.

In the past a number of methods have been employed for displacing liquids, such as crude oil or gasoline, from defective pipe line sections. Of course, where parallel lines are available the problem is a simple one, the fluid from the defective line being merely transferred into a parallel one. In repairing a single crude oil or gasoline pipe line, however, it has heretofore been necessary to displace the fluid in the entire line between adjacent pumping stations with water or, in some cases, displace the fluid with air by means of a special type of pipe line scraper, even when the repairs or replacements themselves would require that the fluid be removed from only a relatively short section of the line.

It is an object of my invention to provide a system for blocking off pipe lines whereby short sections thereof can be quickly and efficiently drained. Another object is to provide a novel method and apparatus for blocking off sections of pipe line and draining the same without loss of oil and without the necessity of draining and refilling the entire line between pumping stations. A further object is to provide an expansible pipe line plug which is particularly adapted for carrying out my method of blocking off pipe lines. Further and more detailed objects and advantages of my invention will be apparent from the following description thereof read in conjunction with the drawings in which:

Figure 1 shows schematically and in perspective an arrangement of apparatus for blocking off and draining a section of pipe line according to my invention;

Figure 2 is a plan view showing in somewhat more detail my method and apparatus for plugging a pipe line at a desired location;

Figure 3 shows in cross section a form of expansible plug according to my invention; and Figure 4 is a cross section of an alternative form of expansible plug.

In one of its broadest aspects my invention comprises temporarily inserting an obstruction into a pipe line at a desired point which will allow the flow of fluid to continue but will prevent any relatively large objects from passing it and dispatching a plug through the line, preferably by means of the fluid, which will expand and block off further flow of fluid upon coming in contact with the obstruction. This operation is most useful in plugging a line at any desired point so that a portion of it downstream from the plug can be drained and repaired or replaced.

The method of carrying out such an operation is illustrated by Figure 1 which shows a pipe line 10 through which crude oil, for example, is pumped from pumping station 11 to receiving station 12. The depressed portion 13 represents a creek crossing which it is desired to drain for repair or replacement. First, pipe line 10 is tapped and an obstruction 14 placed therein at a suitable point higher than section 13 and upstream from it. A by-pass line 15 is then installed with one connection near the lowest point of section 13 and the other at a point 16 upstream from obstruction 14. By-pass line 15 is equipped with gate valves 17 and 18 near section 13 and point 16, respectively, and a third gate valve 19. A portable pumping unit 20 is arranged to take suction through valve 21 from by-pass line 15 between valves 17 and 19 and to discharge into by-pass line 15 through valve 22 at a point between valve 18 and valve 19. The method of inserting obstruction 14 into line 10 and of connecting by-pass line 15 to pipe line 10 will be further described in connection with Figure 2.

A suitable plug 23 which is adapted to travel through the pipe line 10 is inserted therein at pumping station 11 and pumped with the oil, valves 17, 18 and 19 being open and valves 21 and 22 being closed during this procedure. When plug 23 strikes obstruction 14 it expands in such a way as to prevent further flow of oil through pipe line 10, but oil continues to flow through by-pass line 15. Pumping station 11 is then shut down, valve 19 is closed and pumping unit 20 is started pumping to take oil from section 13 through valves 17 and 21 and discharge it through valves 22 and 18 into pipe line 10, through which it will flow into storage facilities at pumping station 11.

When the oil has been completely drained from section 13 and the necessary repairs or replacements have been made, valve 19 is opened to allow oil to flow into the drained area and equalize the pressures on each side of plug 23. Thereafter the obstruction 14 is removed, station 11 is put into operation and the plug 23 allowed to travel with the oil stream into receiving station 12 where it is removed from the pipe line.

Figure 2 shows a particularly suitable form of temporary obstruction to be used in connection with my method of blocking pipe lines. A nipple or short section of metal bar 30 is welded to pipe line 10 and a special nipple 31 is likewise welded thereto at a diametrically opposite point, nipple or bar section 30 being externally threaded to receive cap 32. Gate valve 33 is then threaded on nipple 31, and a hole is drilled by any suitable means through nipple 31 and both walls of pipe line 10, and into nipple or bar section 30. One method of drilling this hole is by the use of the pipe tapping apparatus disclosed in United States Letters Patent 2,097,398, issued October 26, 1937, to J. E. Polston and A. M. Hill. According to this method a tubular member 34 which has a stuffing box 35 on its other end is attached to gate valve 33. A long drill spindle 36 passes through stuffing box 35 and terminates in a drill socket 37 of an external diameter such that it can be retracted into tubular member 34.

It is deemed unnecessary to describe the drilling method in detail since it is fully set forth in the above patent, but it is apparent that it can be carried out when fluid is passing through pipe line 10 under full pressure. When the drilling is complete, the drill and drill spindle 36 are retracted into member 34, gate valve 33 is closed, member 34 is removed from valve 33 and the drill is removed from drill socket 37 and replaced by a metal rod 38, which is preferably of approximately the same size. The apparatus is then reassembled, gate valve 33 opened and drill spindle 36 and rod 38 moved forward into the position shown with the forward end of rod 38 entering nipple or bar section 30. In this way rod 38 is firmly held in position and any possibility that it might be deformed so as to make withdrawal impossible is eliminated.

If desired, the drill bit itself can be allowed to remain in position across the pipe line 10 for use as a temporary obstruction, but this is generally not preferred. Also nipple 30 can be installed, drilled, and provided with a plug as described in United States Patent 2,097,398, but the above method is preferred. Plug 23 which is shown adjacent rod 38 is of a type which will expand and prevent further flow of fluid when subjected to upstream pressure and one example of such a plug is shown in further detail in Figure 3.

Referring now to Figure 3, plug 23 consists essentially of a relatively long cylindrical body having a diameter slightly smaller than the internal diameter of the line in which it is to be used and made of a resilient material such as rubber or a synthetic oil-resistant material having similar properties. The forward (downstream) portion is equipped with a steel plate 40 so that plug 23 will not be unduly worn or injured by contact with rod 38 or a similar obstruction. The rear or upstream portion of plug 23 contains a substantially conical axial depression 41 so that it will be carried along with the fluid stream, but that any upstream pressure will tend to cause plug 23 to expand and seal any pipe line in which it is placed. Further, a plurality of peripheral slots 42 are cut into plug 23 thereby forming a number of circumferential projections 43 which are inclined in the upstream direction and these tend to expand and assist in giving an effective seal between plug 23 and the walls of the pipe line.

Figure 4 illustrates an alternative type of pipe line plug. This plug consists of two sections connected by a flexible ball and socket joint 50, the rear section being made up of three steel washers 51 and two cupped pipe line scraper discs 52 made of rubber or other resilient material threaded alternatively on a shaft 53 which has the ball 54 of ball and socket joint 50 on its front end. This assembly is kept in position by nut 55.

The front section consists of four scraper discs 56 and four steel washers 57 similarly threaded on a shaft 58 which is threaded into the socket portion 59 of ball and socket joint 50 and has an expansible hollow ring 60 of rubber or other resilient material and a sliding sleeve 61 mounted on its front end. A steel washer 62 is welded to shaft 58 at a point adjacent the most forward cupped disc 56 to support expansible ring 60. Steel washer 63 is bolted to the forward end of shaft 58 by means of nut 64 to hold sleeve 61 on shaft 58 and permit easy assembly of parts 58, 60 and 61. Sleeve 61 also carries a washer 65 at its front end to make contact with rod 38 (Figure 2) and a washer 66 welded to its rear end to support expansible ring 60.

In operation the plug is propelled through the pipe line with the fluid stream by the fluid pressure acting on discs 52 and 56. When the plug reaches an obstruction such as rod 38 inserted in the pipe line the sliding sleeve 61 will be forced back along shaft 58 and washer 66 will compress expanding ring 60 against washer 62 thus causing ring 60 to expand against the inside pipe wall and seal the pipe line. The fluid pressure behind the plug caused either by the velocity of the oil if pumping station 11 is operating or by the head of the oil in the rear after the station is shut down acting against cupped discs 52 and 56 will continue to force the plug against rod 38 and hold the ring 60 under compression but when the pressures in front and behind the plug are equalized the resiliency of ring 60 and discs 52 and 56 will cause them to return to their normal shapes and the plug will be free to travel through the pipe line with the fluid stream.

From the above description it will be seen that I have provided a novel and extremely useful method of blocking off pipe lines and that the method and the apparatus I have disclosed for carrying out the same can be utilized in many ways other than those specifically set forth herein. I do not, therefore, desire to be limited to the specific embodiments which I have used to describe my invention, but only by the scope of the appended claims.

I claim:

1. The method of blocking off a section of pipe line which comprises temporarily obstructing said line at a selected point with respect to relatively large objects while allowing the flow of fluid therethrough to continue, and dispatching a plug through said line to said point, said plug being adapted to travel with said fluid and to expand and block further flow of fluid when its further travel is obstructed.

2. The method of blocking off and draining a section of pipe line which comprises temporarily obstructing said line at a selected point with respect to relatively large objects while allowing the flow of fluid therethrough to continue, constructing a by-pass line around said point, dispatching a plug through said line to said point, said plug being adapted to travel with said fluid and to expand and block further flow of fluid when its further travel is obstructed, pumping fluid through said by-pass line from the downstream to the upstream side of said plug, and then shutting off further flow through said by-pass line.

3. The method of blocking off and draining a section of pipe line having a relatively low elevation which comprises temporarily obstructing said line with respect to relatively large objects, while allowing the flow of fluid therethrough to continue, at a relatively high point upstream from said section, constructing a by-pass line between said section to be drained and a point upstream from said relatively high point, dispatching a plug through said line to said point, said plug being adapted to travel with said fluid and to expand and block further flow of fluid when its further travel is obstructed, pumping fluid through said by-pass line from said section to said point upstream from said relatively high point, and then shutting off further flow through said by-pass line.

4. Apparatus for blocking off a section of pipe line comprising means inserted at a desired point within said pipe line forming an obstruction adapted to stop relatively large objects while allowing the continued flow of fluid, and a plug adapted to travel through said pipe line with said fluid and to expand and block further flow of fluid upon coming in contact with said obstruction.

5. Apparatus for blocking off and draining a section of pipe line comprising means inserted at a desired point within said pipe line forming an obstruction adapted to stop relatively large objects while allowing the continued flow of fluid, a by-pass line around said obstruction, means for controlling the flow of fluid through said by-pass line, and a plug adapted to travel through said pipe line with said fluid and to expand and block further flow of fluid upon coming in contact with said obstruction.

6. Apparatus for blocking off and draining a section of pipe line comprising means inserted at a desired point within said pipe line forming an obstruction adapted to stop relatively large objects while allowing the continued flow of fluid, a by-pass line around said obstruction, a pump adapted to pump fluid through said by-pass line from the downstream to the upstream side of said obstruction, means for shutting off flow through said by-pass line and a plug adapted to travel through said pipe line with said fluid and to expand and block further flow of fluid upon coming in contact with said obstruction.

7. Apparatus for blocking off a section of pipe line comprising means inserted at a desired point within said pipe line forming an obstruction adapted to stop relatively large objects while allowing the continued flow of fluid, and a plug comprising an elongated member having a forward contact portion and a plurality of resilient circumferential projections therefrom having a diameter substantially equal to the internal diameter of said pipe line, said plug including means actuated by the pressure of said fluid on said plug when said forward portion is in contact with said obstruction for causing the diameter of at least some of said projections to increase, whereby further flow of fluid through said pipe line is effectively blocked.

CHARLES E. WILSON.